US008481945B2

(12) United States Patent
Koyama et al.

(10) Patent No.: US 8,481,945 B2
(45) Date of Patent: Jul. 9, 2013

(54) OPTICAL FREQUENCY CONVERTER

(75) Inventors: Yasushi Koyama, Kamakura (JP); Kousuke Kajiki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 13/195,594

(22) Filed: Aug. 1, 2011

(65) Prior Publication Data

US 2012/0032080 A1 Feb. 9, 2012

(30) Foreign Application Priority Data

Aug. 5, 2010 (JP) ................................ 2010-175827
Jul. 12, 2011 (JP) ................................ 2011-154360

(51) Int. Cl.
*G01J 5/02* (2006.01)

(52) U.S. Cl.
USPC ....................................................... 250/341.1

(58) Field of Classification Search
USPC ........................................... 250/341.1–341.9
See application file for complete search history.

(56) References Cited

U.S. PATENT DOCUMENTS 6,490,388 B1 * 12/2002 Manzur .......................... 385/27
7,187,832 B2 * 3/2007 Lidorikis et al. .............. 385/125
8,035,083 B1 * 10/2011 Kozlov et al. .............. 250/341.1
2009/0314943 A1 * 12/2009 Breit et al. ................. 250/341.1

OTHER PUBLICATIONS

Deibel et al., "The excitation and emission of terahertz surface plasmon polaritions on metal wire waveguides," 2008, C. R. Physique, vol. 9, pp. 215-231.*

Ito et al., "Flexible terahertz fiber optics with low bend-induced losses," 2007, Journal of Optical Society of America B, vol. 24, No. 5, pp. 1230-1235.*

Hebling et al., Generation of high-power terahertz pulses by tilted-pulse-front excitation and their application possibilities, Journal of Optical Society of America, Jul. 2008, pp. B6-B19, vol. 25, No. 7.

Suizu et al., Extremely frequency-widened terahertz wave generation using Cherenkov-type radiation, Optics Express, Apr. 2009, pp. 6676-6681, vol. 17, No. 8.

* cited by examiner

*Primary Examiner* — Kiho Kim
(74) *Attorney, Agent, or Firm* — Canon U.S.A., Inc. IP Division

(57) ABSTRACT

An optical frequency converter includes a waveguide including a core made of a nonlinear optical medium having a refractive index $n_{1,light}$ in a wavelength region of light, and cladding disposed so as to cover the core and made of a material whose refractive index $n_{2,light}$ in the wavelength region of light is lower than the refractive index $n_{1,light}$, and a coupling section made of a material whose refractive index $n_{3,THz}$ in a wavelength region of a terahertz wave is higher than the refractive index $n_{1,light}$ and disposed in contact with the cladding. The coupling section is configured to couple the waveguide with a space in the wavelength region of the terahertz wave. The coupling section covers the cladding.

14 Claims, 10 Drawing Sheets

IC IB 100 101 103 104 102 IC
TERAHERTZ WAVE 104 $\theta_1$ $\theta_3$ EXCITATION LIGHT 103 z y x 101 102 104

OPTICAL FREQUENCY CONVERTER

BACKGROUND OF THE INVENTION

1. Field of the Invention

The present invention relates to an optical frequency converter that performs frequency conversion between light and a terahertz wave including an electromagnetic wave component in a frequency region ranging from a millimeter waveband to a terahertz waveband (30 GHz to 30 THz), and to a device equipped with the optical frequency converter. In particular, the present invention relates to an element that generates an electromagnetic wave including a Fourier component in the aforementioned frequency region by emitting a laser beam to a nonlinear optical crystal, or that detects the electromagnetic wave, and to a tomography device based on terahertz time-domain spectroscopy (THz-TDS) equipped with such an element.

2. Description of the Related Art

In the frequency region of a terahertz wave, many organic molecules of a biomaterial, a medicinal drug, an electronic material, or the like have an absorption peak deriving from the structure or the state thereof. Furthermore, terahertz waves have high transmissivity through materials such as paper, a ceramic material, resin, and fabric. In recent years, research and development of imaging and sensing technologies that utilize such characteristics of terahertz waves have been implemented. For example, terahertz waves are expected to be applied to fluoroscopic inspection devices, which are safe, in place of X-ray devices, or to in-line non-destructive inspection devices used in manufacturing processes. A widely used method of generating a terahertz wave is a method that uses a nonlinear optical crystal. Examples of a nonlinear optical crystal include $LiNbO_x$ (which will sometimes be referred to as "Lithium Niobate" or simply "LN" hereinafter), $LiTaO_x$, $NbTaO_x$, KTP, DAST, ZnTe, GaSe, GaP, and CdTe. Here the subscript "x" stands for a positive integer. A terahertz wave is generated by utilizing a second-order nonlinear phenomenon, and difference-frequency generation (DFG) based on input of two laser beams having different frequencies is known. In nonlinear crystal materials, DFG can occur where two laser beams generate another beam with the difference of the optical frequencies of the two laser beams. Moreover, monochromatic terahertz-wave generation based on an optical parametric process and terahertz-pulse generation based on optical rectification using a femtosecond pulsed laser beam are also known.

As a process for generating a terahertz wave from the aforementioned nonlinear optical crystal, electro-optical Cerenkov radiation has recently been receiving attention. Specifically, referring to FIG. 8, Cerenkov radiation is a phenomenon in which, when a propagation group velocity of a laser beam 2 acting as an excitation source is higher than a propagation phase velocity of a generated terahertz wave, a terahertz wave 1 is conically released like a shock wave. Based on a refractive-index ratio between the light and the terahertz wave within a medium (i.e., nonlinear optical crystal), a radiation angle $\theta_c$ of the terahertz wave is determined from the following expression:

$$\cos\theta_c = v_{THz}/vg = ng/n_{THz}$$

where vg and ng respectively denote a group velocity and a group refractive index of the excitation light, and $v_{THz}$ and $n_{THz}$ respectively denote a phase velocity and a refractive index of the terahertz wave. There has been a report with regard to generation of a high-intensity terahertz pulse based on optical rectification by making a femtosecond laser beam with a tilted wavefront enter LN by utilizing the Cerenkov radiation phenomenon. See, Hebling et al., "Generation of high-power terahertz pulses by tilted-pulse-front excitation and their application possibilities", J. Opt. Soc. Am. B, Vol. 25, pp. B6-B19 (2008) (Document 1). Moreover, in order to eliminate the need for tilting the wavefront, there has also been a report with regard to the use of a slab waveguide having a thickness smaller than the wavelength of a generated terahertz wave so as to generate a monochromatic terahertz wave on the basis of the DFG method. See, Suizu et al., "Extremely frequency-widened terahertz wave generation using Cherenkov-type radiation", Opt. Express, Vol. 17, pp. 6676-6681 (2009) (Document 2).

Because a terahertz wave is generated by excitation of a traveling wave in the examples in Document 1 and Document 2, extraction efficiency is increased by phase-matching in the radiation direction and combining the intensity of terahertz waves generated from different wave sources. Characteristic features of this radiation method include a capability to achieve relatively high efficiency and generate a high-intensity terahertz wave when a nonlinear optical crystal is used, and a capability to broaden the terahertz waveband by selecting a high-frequency side for the absorption in a terahertz region due to phonon resonance, which is a distinctive feature of crystals. These technologies allow for a broader generation band, as compared with when a terahertz wave is generated by a photoconductor, and also allow for a narrower pulse width when a terahertz pulse is generated by utilizing optical rectification. For example, in the case where these technologies are applied to a terahertz time-domain spectroscopy device, it is expected that the device performance can be enhanced.

However, with the technique discussed in Document 1, it may not be easy to efficiently converge and control the terahertz wave that is Cerenkov-radiated in a conical shape. For example, when the slab waveguide formed on a substrate disclosed in Document 2 is used, only a component above the substrate can substantially be used from the terahertz wave radiated in all directions. Therefore, there is a limit with regard to the enhancement of the conversion efficiency. Moreover, it is not easy to couple the excitation light to the slab waveguide, made of a nonlinear-optical-crystal thin film having a thickness of about several micrometers, with high efficiency, and because nonlinear polarization based on the excitation light is proportional to the square of the input electric field, there is room for an improvement in terms of efficiency.

SUMMARY OF THE INVENTION

An optical frequency converter according to an aspect of the present invention includes a waveguide including a core made of a nonlinear optical medium having a refractive index $n_{1,light}$ in a wavelength region of light, and cladding disposed so as to cover the core and made of a material whose refractive index $n_{2,light}$ in the wavelength region of light is lower than the refractive index $n_{1,light}$, and a coupling section made of a material whose refractive index $n_{3,THz}$ in a wavelength region of a terahertz wave is higher than the refractive index $n_{1,light}$ and disposed in contact with the cladding. The coupling section is configured to couple the waveguide with a space in the wavelength region of the terahertz wave. The coupling section covers the cladding.

With the optical frequency converter according to the above aspect of the present invention, a terahertz wave conically radiated in all directions due to a nonlinear optical effect of light propagating through a fibrous waveguide provided with low-refractive-index cladding disposed in contact with a core made of a nonlinear optical crystal is efficiently extracted to a space by a coupling section disposed in contact with the cladding.

Further features of the present invention will become apparent from the following description of exemplary embodiments with reference to the attached drawings.

DESCRIPTION OF THE EMBODIMENTS

In an optical frequency converter according to the present invention, a coupling section that extracts a terahertz wave radiated due to a nonlinear optical effect of light from a waveguide, which includes cladding that covers a core made of a nonlinear optical crystal, to a space covers the cladding so that the terahertz wave can be efficiently extracted. Alternatively, the optical frequency converter according to the present invention includes a coupling section that extracts a terahertz wave radiated due to a nonlinear optical effect of light from a waveguide, which includes cladding disposed in contact with a core made of a nonlinear optical crystal, to a space, and the cladding has a thickness that is set within a range that allows the terahertz wave to be radiated efficiently. Based on these ideas, the optical frequency converter according to the present invention has the basic configuration as described in the summary of the invention. Furthermore, with the same configuration, a terahertz wave can be detected by a reversal process.

Embodiments and a practical example will be described below with reference to the drawings.

First Embodiment

Figure 1A:
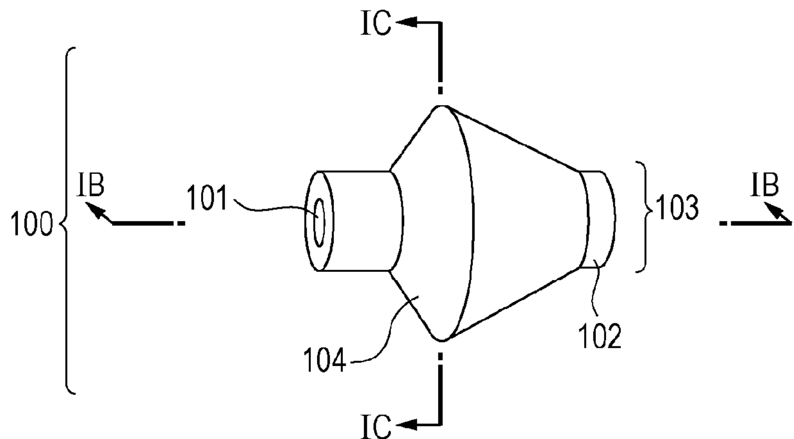
FIG. 1A is a schematic perspective view of an optical frequency converter according to a first embodiment of the present invention.
Figure 1B:
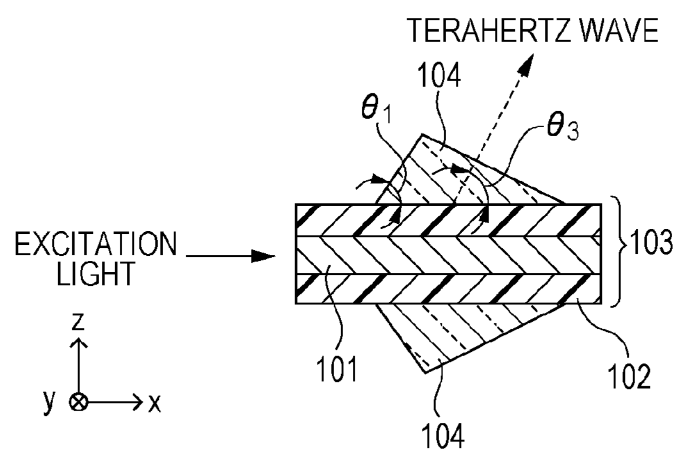
FIG. 1B is a cross-sectional view of the optical frequency converter according to the first embodiment of the present invention, taken along line IB-IB in FIG. 1A.
Figure 1C:
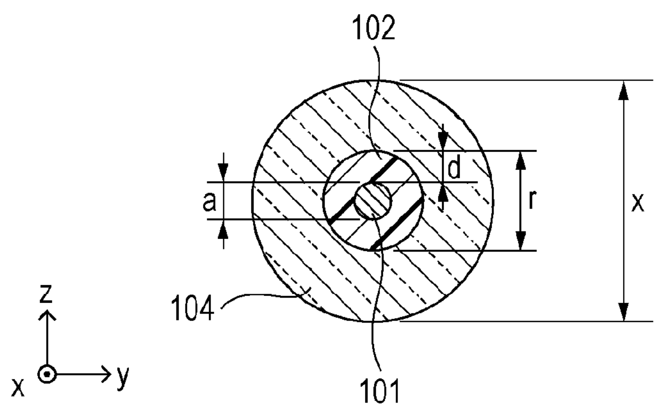
FIG. 1C is a cross-sectional view of the optical frequency converter according to the first embodiment of the present invention, taken along line IC-IC in FIG. 1A.

An optical frequency converter 100 according to a first embodiment of the present invention will now be described with reference to FIGS. 1A to 3B. FIGS. 1A to 1C are structural diagrams of the first embodiment. Specifically, FIG. 1A is a schematic perspective view of the optical frequency converter 100, FIG. 1B is a cross-sectional view of the optical frequency converter 100 taken along line IB-IB in FIG. 1A, and FIG. 1C is a cross-sectional view of the optical frequency converter 100 taken along line IC-IC in FIG. 1A. The optical frequency converter 100 according to this embodiment includes a waveguide 103 constituted of a core 101 and cladding 102 that covers the core 101, and a coupling section 104 that covers the cladding 102. In this embodiment, the waveguide 103 has a fiber structure that is circular in cross section, and excitation light entering this structure is confined within the waveguide 103 and is transmitted along an x axis.

The core 101 is formed of a nonlinear optical crystal. As shown in FIG. 1B, in this embodiment, a Mg-doped lithium niobate (LN) single crystal whose crystal axis of a nonlinear optical constant $d_{33}$ is aligned with an z axis is used. Specifically, the crystal axis is set such that a phase matching condition is satisfied between wave vectors of light waves (i.e., a terahertz wave and excitation light) involved in a second-order nonlinear process. In this case, when a polarized wave parallel to the z axis enters the waveguide 103 as excitation light, a second-order nonlinear effect occurs due to the nonlinear optical constant $d_{33}$. Therefore, if the excitation light includes two laser beams with a frequency difference substantially equal to the frequency of a terahertz wave, difference frequency generation occurs. Alternatively, if the excitation light is a femtosecond pulsed laser beam, optical rectification occurs, causing a terahertz wave to be radiated. In order to satisfy a phase matching condition of electro-optical Cerenkov radiation, a core diameter a is set to be smaller than or equal to ½ of an equivalent wavelength, in the waveguide 103, of a terahertz wave component with the highest frequency in the terahertz wave to be radiated to a space. In this case, a phase shift equivalent to the diameter of the core 101 is smaller than or equal to a thickness that does not cause the generated terahertz wave components to be inverted and cancel out each other in an equiphase wave surface thereof. More preferably, the core diameter a is set to be smaller than or equal to about 1/10 of this equivalent wavelength. Accordingly, in this embodiment, electro-optical Cerenkov radiation is derived from a nonlinear optical effect.

The cladding 102 is at least composed of a material with a refractive index lower than that of the core 101 in a wavelength region of the excitation light, that is, a material that satisfies the condition $n_{1,light}>n_{2,light}$. In this case, $n_{1,light}$ denotes the refractive index of the core 101 in the wavelength region of the excitation light, and $n_{2,light}$ denotes the refractive index of the cladding 102 in the wavelength region of the excitation light. For example, if the core 101 is composed of Mg-doped LN, the cladding 102 is desirably composed of a LN single crystal, Mg-ion-diffused or proton-exchanged LN, or a resin material such as polyethylene terephthalate (PET) or epoxy. The cladding 102 covers the core 101. The term "cover" used here refers to a state in which the cladding 102 substantially covers the outer periphery of the core 101 when a certain cross section of the optical frequency converter 100 is viewed. With the cladding 102 having the lower refractive index, the excitation light is confined within the core 101. According to the nonlinear optical effect within the core 101, a conically-radiated terahertz wave that satisfies the phase matching condition can be substantially entirely extracted to the exterior of the waveguide 103, that is, to the coupling section 104 that covers the cladding 102.

A thickness d of the cladding 102 (which can be expressed as d=(r−a)/2 when the waveguide 103 has a diameter r) is desirably set to be smaller than or equal to a thickness with which an effect of multiple reflection or loss of the radiated terahertz wave at an interface between the cladding 102 and the coupling section 104 is substantially negligible. Therefore, the thickness d is desirably smaller than or equal to ½ of the equivalent wavelength of the terahertz wave within the cladding 102. More preferably, the thickness d may be set to be smaller than or equal to about 1/10 of an equivalent wavelength, in the cladding 102, of a terahertz wave component with the highest frequency to be radiated to the space. This is because, in a structural body with a size equal to or smaller than about 1/10 of the wavelength, the effects of reflection, dispersion, refraction, and the like relative to an electromagnetic wave having this wavelength are generally considered as being negligible.

Furthermore, it is desirable that the thickness d be a thickness that allows the excitation light to propagate through the waveguide 103 with low loss. Specifically, the thickness d is desirably set to be larger than or equal to a thickness that allows the intensity of the excitation light at the interface between the cladding 102 and the coupling section 104 to be substantially smaller than or equal to $1/e^2$ (e being the base of a natural logarithm) of the intensity of the excitation light within the core 101. Accordingly, low-loss transmission of the excitation light within the waveguide 103 is achieved. It is needless to say that the optical frequency converter according to the present invention can generate a terahertz wave even if the thickness d is outside the desired range described above.

The coupling section 104 is provided for extracting the terahertz wave radiated due to the nonlinear optical effect of the excitation light propagating through the waveguide 103 to the space, and can be formed of a prism, a diffraction grating, a photonic crystal, or the like. For example, in this embodiment, a structural body (conical prism) constituted of a rotated prism is used as the coupling section 104. The prism is suitably used as the coupling section 104 since it can extract a terahertz wave over a wide band. A material that has a refractive index satisfying the condition $n_{1,light}<n_{3,THz}$ and that can transmit a terahertz wave with low loss is suitably used as the coupling section 104. In this case, $n_{3,THz}$ denotes a refractive index of the coupling section 104 in the wavelength region of the terahertz wave. Multiple reflection and loss at the interface between the coupling section 104 and the cladding 102 can be suppressed, and the terahertz wave Cerenkov-radiated by the waveguide 103 can be extracted to the outside. The coupling section 104 in this embodiment is disposed in contact with the cladding 102 and has a structure that covers the cladding 102. The term "cover" used here refers to a state in which the coupling section 104 substantially covers the outer periphery of the cladding 102 when a certain cross section of the optical frequency converter 100 is viewed. Accordingly, the terahertz wave radiated in a conical shape at an angle $\theta_c$ in the core 101 is conically transmitted in all directions at an angle $\theta_3$ (see FIG. 1B) by the coupling section 104 that covers the outer periphery of the cladding 102. The coupling section 104 does not necessarily need to completely cover the entire circumference of the cladding 102. For example, the coupling section 104 may be disposed only in a direction in which the terahertz wave is to be desirably radiated.

In this embodiment, the coupling section 104 at least has a structure having a conical surface at an interface between the coupling section 104 and the space. In this case, total internal reflection loss of the terahertz wave conically propagating through the coupling section 104 is suppressed at the interface between the coupling section 104 and the space, and the terahertz wave is extracted to the space. The coupling section 104 may be of any kind so long as it has a structure that can extract the terahertz wave radiated in all directions from the waveguide 103, and may alternatively have a rotational surface, such as a rotational paraboloidal surface or a spherical surface, instead of a conical surface. In this case, the axis of the rotational surface is desirably aligned with the direction of propagation of the excitation light.

Figure 4A:
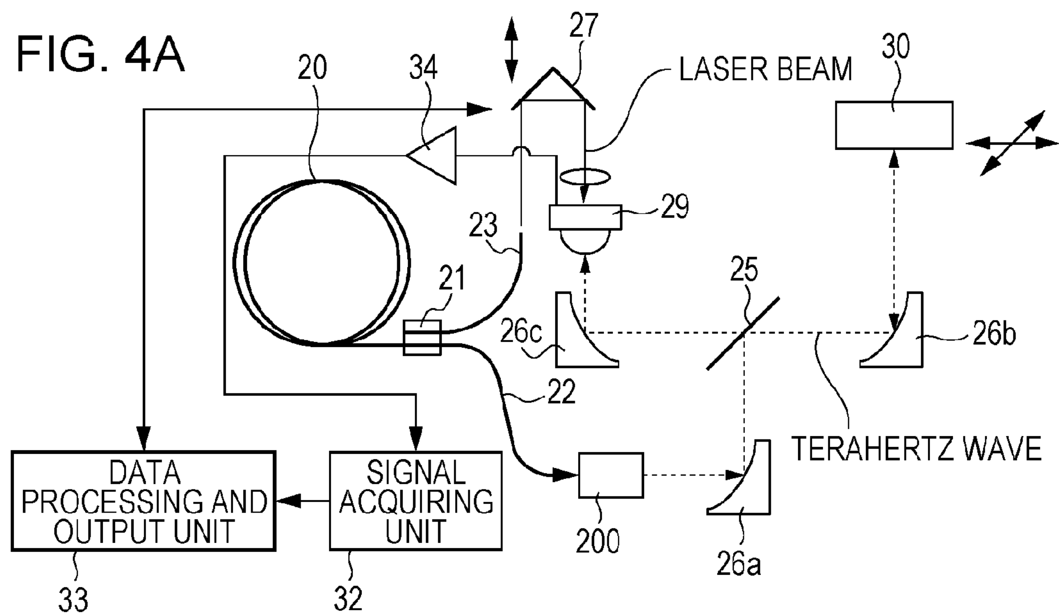
FIG. 4A illustrates a spectroscopy device according to a second embodiment of the present invention.
Figure 4B:
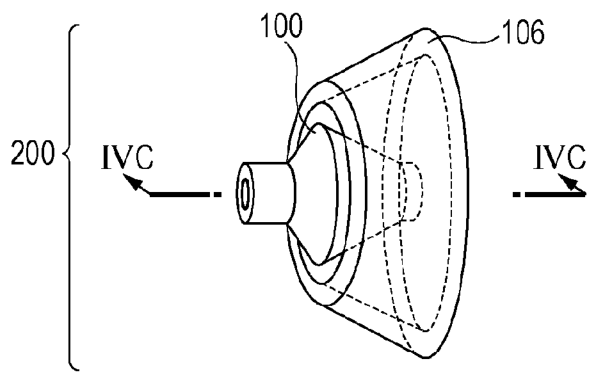
FIG. 4B is a schematic view of a terahertz-wave generator in the spectroscopy device according to the second embodiment of the present invention.

In FIG. 1B, if the coupling section 104 has a structure having a right triangle in cross section that satisfies the condition $\theta_1=90-\theta_3$, a terahertz wave with a matched phase front in a certain direction (such as a direction indicated by a dotted arrow in FIG. 1B) can be extracted to the space with low loss. In addition, although a detailed description will be provided later in a second embodiment, a converging section 106 having a conical surface, as shown in FIG. 4B, can also be used to extract a beam in which the direction and the phase of the terahertz wave radiated substantially in all directions into the space are aligned with each other. The converging section 106 may be of any kind so long as it can converge and control the terahertz wave radiated from the coupling section 104, and may alternatively have a rotational surface, such as a rotational paraboloidal surface or a spherical surface, instead of a conical surface. In this case, the axis of the rotational surface is also desirably aligned with the direction of propagation of the excitation light.

In the configuration described above, the excitation light entering the waveguide 103 having a fiber structure propagates therethrough with low loss, and the phase matching condition of the nonlinear optical effect in the core 101 is satisfied, whereby the terahertz wave is conically Cerenkov-radiated at the radiation angle $\theta_c$. The terahertz wave radiated in all directions from the core 101 is extracted to the exterior of the waveguide 103, that is, to the coupling section 104, via the thin, lower-refractive-index of cladding 102 that covers the core 101 and via the coupling section 104 that covers the cladding 102. The terahertz wave extracted to the coupling section 104 can be extracted to the space as a beam, whose direction and phase are aligned, via the conical surface of the coupling section 104, the converging section 106, and the like. Therefore, the optical frequency converter 100 according to this embodiment solves the problem existed in the related art with regard to converging and controlling of a conically Cerenkov-radiated terahertz wave. In particular, since the terahertz wave can be extracted substantially in all directions with hardly any loss in this embodiment, a further improvement in conversion efficiency is expected, as compared with the related art. For example, with the configuration in the related art that uses a slab waveguide and a silicon prism, a radiated component with an angle larger than or equal to $2\times$(critical angle)$=2\times\mathrm{Sin}^{-1}(1/n_{3,THz})=35°$ cannot be extracted to the space from a y-axis direction in FIGS. 1B and 1C due to total internal reflection. In contrast, with the configuration in this embodiment in which the cladding 102 is covered with the coupling section 104, the terahertz wave can be extracted substantially from all directions, whereby an increase in output by about one digit is expected.

Furthermore, with the use of the waveguide 103 having a fiber structure as in this embodiment, highly-efficient fiber-optic coupling and transmission technologies widely used in a communication waveband can be applied to the coupling and transmission between the excitation light and the waveguide 103. In view of the fact that nonlinear polarization is proportional to the square of electric-field intensity of excitation light, an improvement in conversion efficiency due to an increase in the intensity of excitation light is also expected in this embodiment.

Figure 2A:
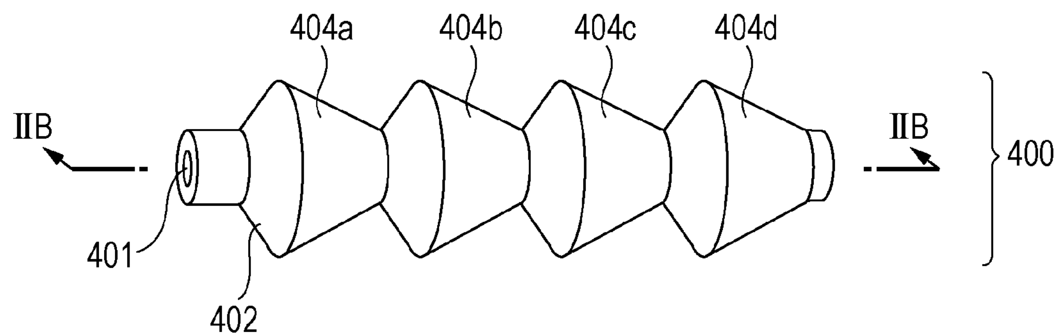
FIG. 2A is a schematic perspective view illustrating a modification of the first embodiment.
Figure 2B:
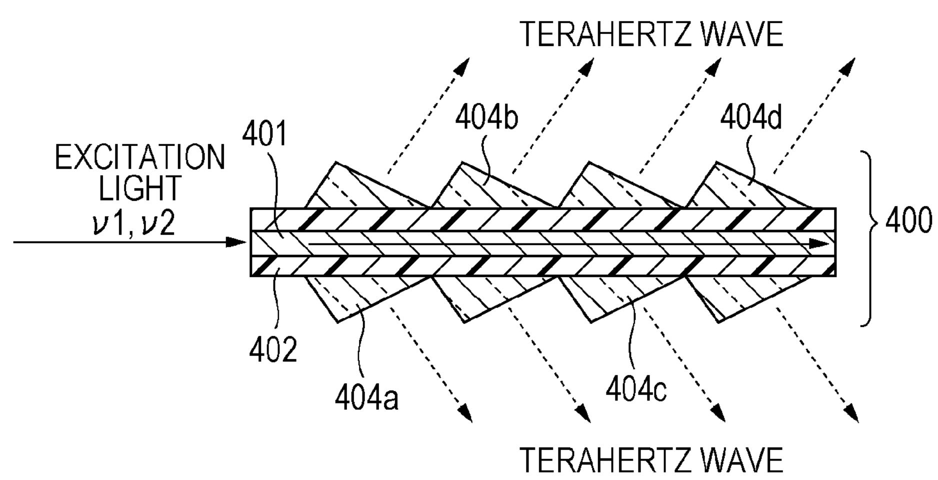
FIG. 2B is a cross-sectional view of the modification of the first embodiment, taken along line IIB-IIB in FIG. 2A.

A modification of this embodiment will now be described. FIGS. 2A and 2B are structural diagrams showing the modification of the first embodiment. Specifically, FIG. 2A is a schematic perspective view of an optical frequency converter 400, and FIG. 2B is a cross-sectional view of the optical frequency converter 400 taken along line IIB-IIB in FIG. 2B. As in this optical frequency converter 400, a configuration in which a plurality of the above-described optical frequency converters 100 are coupled to each other in multiple levels is also possible. In the example shown in FIGS. 2A and 2B, cladding 402 that covers a core 401 of a waveguide is coupled to four coupling sections 404*a*, 404*b*, 404*c*, and 404*d* (404). This configuration is especially advantageous in a method that inputs two laser beams having different oscillation frequencies ν1 and ν2 as excitation light and outputs a monochromatic terahertz wave corresponding to a difference frequency. Examples of a laser light source that can be used include a KTP-OPO (optical-parametric-oscillator) light source of a Nd:YAG laser excitation type, and two wavelength-tunable laser diodes. By extending the length of the waveguide in contact with the coupling sections 404 to, for example, 4 mm in this manner, an output of a terahertz wave to be radiated can be increased while the entire volume remains to be small, and the distance by which the terahertz wave propagates through each coupling section 404 can be reduced so as to allow for a reduction in loss, thereby achieving increased efficiency.

Figure 3A:
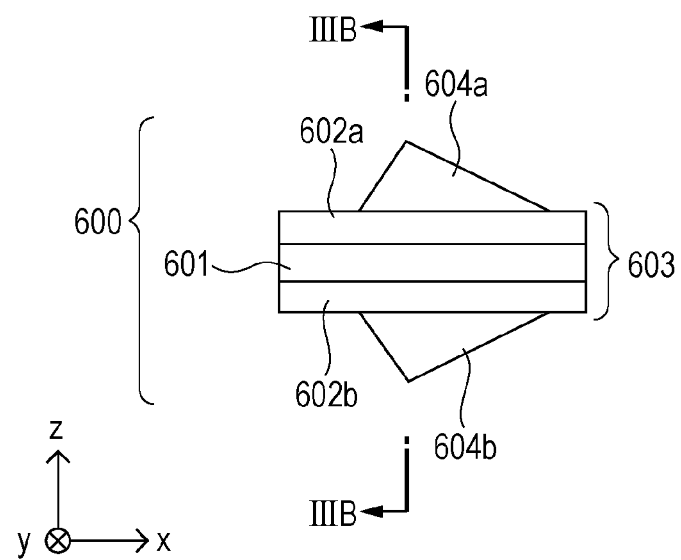
FIG. 3A is a cross-sectional view illustrating another modification of the first embodiment.
Figure 3B:
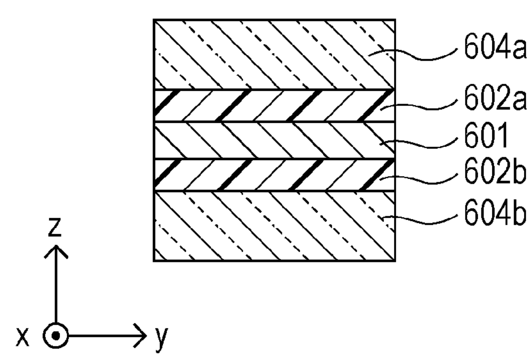
FIG. 3B is a cross-sectional view of the modification of the first embodiment, taken along line IIIB-IIIB in FIG. 3A.

FIGS. 3A and 3B illustrate an optical frequency converter 600 as another conceivable modification of this embodiment. Specifically, FIG. 3A is a cross-sectional view corresponding to FIG. 1B, and FIG. 3B is a cross-sectional view of the optical frequency converter 600 taken along line IIIB-IIIB in FIG. 3A. The optical frequency converter 600 includes a parallel-plate-type waveguide 603 in which a core 601 is sandwiched between cladding 602*a* and cladding 602*b*, and two coupling sections 604*a* and 604*b* that sandwich the waveguide 603. The core 601, the cladding 602*a*, the cladding 602*b*, and the coupling sections 604*a* and 604*b* are composed of materials and have structures that satisfy the aforementioned conditions regarding refractive indices, thicknesses, and the like. This configuration is advantageous in a case where, of a terahertz wave radiated in all directions, terahertz wave components radiated upward and downward (i.e., z-axis direction in FIG. 3A) are to be selectively extracted to the space.

The above description is directed to an example in which a LN crystal, which is a nonlinear optical crystal, is used as a nonlinear optical medium constituting a core. As alternative examples, $LiTaO_x$, $NbTaO_x$, ZnTe, GaSe, GaP, and CdTe, as mentioned in the description of the related art, may also be used. As a further alternative, an organic nonlinear optical material, such as POM (3-methyl-4-nitropyridine-1-oxide), mNA (meta-nitroaniline), MNA (2-methyl-4-nitroaniline), DAST, or KTP may be used. With LN, there is a difference in refractive indices described in the description of the related art with respect to a terahertz wave and excitation light, and a terahertz wave that is generated in a non-colinear manner can be extracted. Since such a difference is not always large in other crystals, the extraction can sometimes be difficult. However, by using a prism (composed of, for example, Si) having a refractive index greater than that of a nonlinear optical crystal, a Cerenkov radiation condition ($v_{THz}<vg$) can be satisfied so that the terahertz wave can be extracted to the outside. Furthermore, in addition to the case where the core is made of a typical nonlinear optical crystal, the present invention can also be applied to a case where the core is made of a nonlinear optical medium with a structure in which a second-order nonlinear optical effect occurs.

The cladding 102 may be composed of any kind of material so long as the material has a refractive index that satisfies the condition $n_{1,light}>n_{2,light}$ and has a low absorption coefficient in a terahertz waveband. The cladding 102 may be formed of an inorganic film composed of $SiO_2$, $TiO_2$, or the like, or may be composed of an organic resin material, such as BCB, epoxy resin, or polyethylene. The material may be appropriately selected in accordance with the refractive index of the nonlinear optical crystal used as the core 101.

The coupling section 104 is preferably composed of a material that has a refractive index satisfying the condition $n_{1,light}<n_{3,THz}$ and that can transmit a terahertz wave with low loss. For example, a material with a relatively high refractive index, such as Si, Ge, diamond, GaAs, InP, InGaAs, GaP, GaN, ZnTe, ZnSe, or GaSe, is suitably used. Based on the aforementioned condition, it is preferable that the materials used for the coupling section 104 and the cladding 102 be selected so that the refractive indices thereof satisfy the condition $n_{2,light}<n_{3,THz}$. Therefore, if $n_{2,THz}$ is defined as the refractive index of the cladding 102 in the wavelength region of the terahertz wave, the aforementioned condition can be readily satisfied by selecting materials that satisfy the condition $n_{2,THz}<n_{3,THz}$.

Figure 9A:
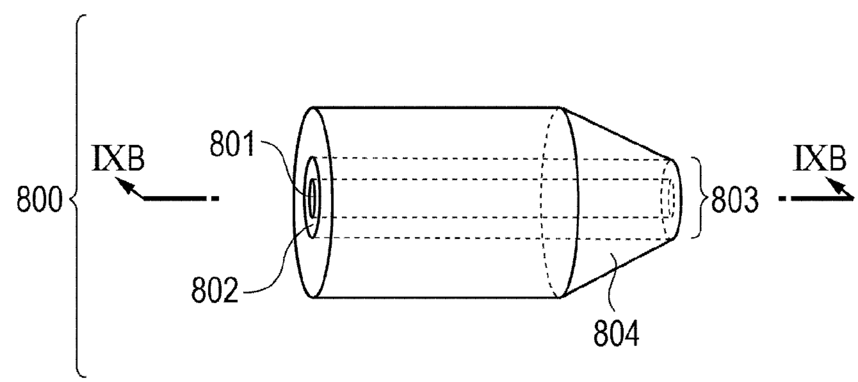
FIG. 9A is a structural diagram of another modification of the first embodiment.
Figure 9B:
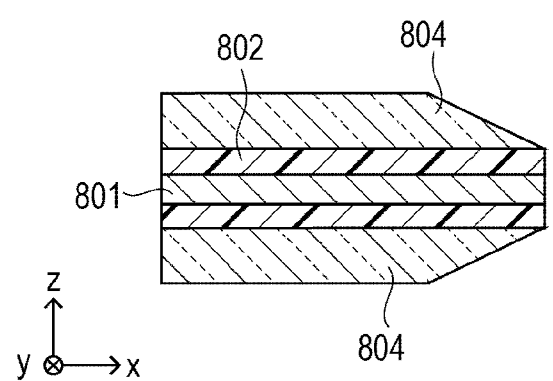
FIG. 9B is a cross-sectional view of the modification of the first embodiment, taken along line IXB-IXB in FIG. 9A.

Referring to FIGS. 9A and 9B, a coupling section 804 has a cylindrical fiber structure with a tapered end, whereby the configuration of the present invention can be fabricated relatively easily. An optical frequency converter 800 includes a waveguide 803 constituted of a core 801 and cladding 802 that covers the core 801, and the coupling section 804 that covers the cladding 802. The first embodiment shown in FIGS. 1A to 1C is an example in which the coupling section 104 serving as a rotational body having an axis defined by the core 101 covers the entire surface of the cladding 102 so as to radiate a terahertz wave substantially in all directions. Alternatively, the coupling section 104 may only cover a freely-chosen area of the cladding 102, and the remaining area may be masked with another material so that the terahertz wave can be extracted only in a freely-chosen direction (not shown).

First Practical Example

A specific practical example corresponding to the first embodiment will now be described. In the optical frequency converter 100 in this practical example shown in FIGS. 1A to 1C, the core 101 has a diameter a of 4 μm and is formed of a 5-mol % Mg-doped lithium niobate single crystal whose crystal axis of a nonlinear optical constant $d_{33}$ is aligned with the z axis. The core 101 has a refractive index $n_{1,light}$ of about 2.2 in a waveband of excitation light (1.55 μm). The cladding 102 is formed of a polyethylene terephthalate (PET) layer with a thickness d of 3 μm and has a refractive index $n_{2,light}$ of about 1.2 in the waveband of light. The waveguide 103 has a fiber structure with a diameter r of 10 μm and circular in cross section. In the waveguide 103 having such a configuration, excitation light propagates therethrough in substantially a single mode of $HE_{11}$. The thickness d is set as follows. Specifically, when the optical frequency converter 100 handles up to 7 THz, the wavelength in a free space is about 43 μm. Assuming that an equivalent wavelength is a value divided by the refractive index 1.3 of the cladding 102, the thickness d is equal to 3 μm, which is smaller than or equal to λ/10 (=43/1.3/10), as described in the first embodiment. In this practical example, the cladding (PET layer) 102 also functions as an adhesive layer between the waveguide 103 and the coupling section 104 composed of high-resistance silicon.

Referring to FIG. 1B, the coupling section 104 has a rotated conical structure formed of a right-triangular prism with an angle $\theta_1$ of about 41°. The conical structure has a hollow central portion in which the waveguide 103 is disposed. The coupling section 104 has a diameter x of about 500 μm and a length of about 1 mm, and is in contact with the waveguide 103 via the cladding 102 serving as an adhesive layer. Based on a difference in refractive indices of light and a terahertz wave, if LN is used for the cladding 102, a Cerenkov-radiation angle is about 65° when the terahertz wave Cerenkov-radiated from the waveguide 103 is extracted to the space. Therefore, in the case where the coupling section 104 is a prism, as mentioned above, high-resistance silicon, which can transmit a terahertz wave with low loss, is suitably used as a material that can extract the terahertz wave radiated from the waveguide 103 into the atmosphere without total internal reflection. In this case, an angle $\theta_3$ formed between the interface between the cladding 102 and the coupling section 104 and the terahertz wave entering the coupling section 104 is about 49°. In this case, a refractive index $n_{3,THz}$ of high-resistance silicon in the wavelength region of the terahertz wave is about 3.4, and the refractive-index relationship $n_{1,light}<n_{3,THz}$ described in the first embodiment is satisfied.

Figure 4C:
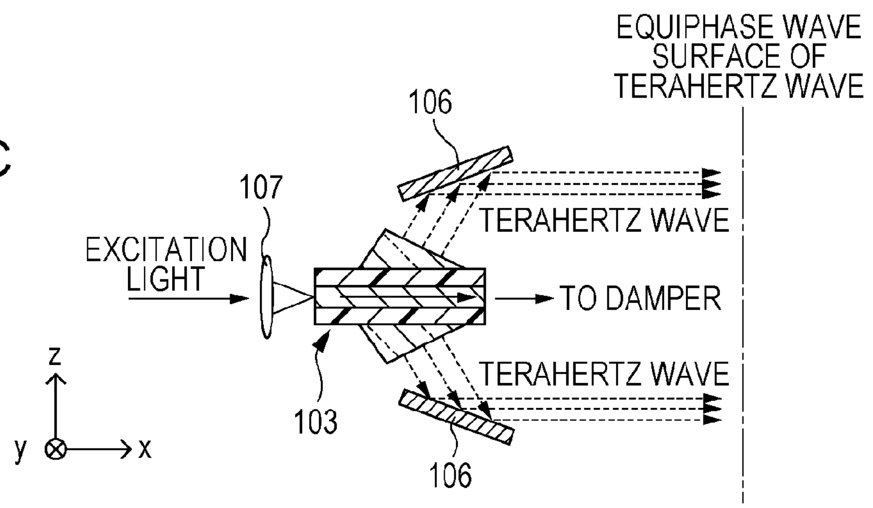
FIG. 4C is a cross-sectional view of the terahertz-wave generator in the spectroscopy device according to the second embodiment of the present invention, taken along line IVC-IVC in FIG. 4B.

Due to a large accumulation of know-hows and high-precision material processing techniques, such as etching, film formation, joining, polishing, and grinding, for silicon as a semiconductor material, silicon is a significantly advantageous material in terms of fabrication of the configuration according to the present invention. Since the condition $\theta_1=\theta_3$ is substantially satisfied in this practical example, a terahertz wave is output substantially orthogonally from the inclined surface of the coupling section 104. However, $\theta_1$ does not necessarily need to be equal to $\theta_3$, and the direction in which the terahertz wave is output to the space does not necessarily need to be orthogonal to the inclined surface. Furthermore, with an addition of the converging section 106 to be described below in the second embodiment, the direction and the phase of the extracted terahertz wave can be aligned with each other. For example, the converging section 106 is composed of aluminum that is surface-coated with silver, and has a structure with a conical surface. The converging section 106 aligns the direction and the phase front of the terahertz wave extracted into the space, as shown in FIG. 4C, and converges the terahertz wave onto a parabolic mirror or the like.

Second Embodiment

By using the optical frequency converter according to the present invention for generating a terahertz wave, a spectroscopy device, a tomography device, and the like that utilize a high-output terahertz wave with aligned phase and direction can be provided. An example will be described below. FIG. 4A illustrates an example of a tomographic imaging device based on a terahertz time-domain spectroscopy (THz-TDS) system that uses the optical frequency converter according to the present invention as a terahertz-wave generator. FIG. 4B schematically illustrates a terahertz-wave generator 200 equipped with the converging section 106, and FIG. 4C is a cross-sectional view taken along line IVC-IVC in FIG. 4B.

A femtosecond laser 20 including optical fibers is used as an excitation light source, and an output is extracted from a fiber 22 and a fiber 23 via a demultiplexer 21. Although the femtosecond laser 20 used normally has a center wavelength of 1.55 μm, a pulse width of 20 fs, and a cyclic frequency of 50 MHz, the wavelength may alternatively be in a 1.06-μm band, and the pulse width and the cyclic frequency are not limited to the aforementioned values. The fibers 22 and 23 at the output stage may each include a high nonlinear fiber for high-order soliton compression at the final stage or a dispersive fiber that performs prechirping for compensating for dispersion by an optical element or the like extending to a terahertz generator and a terahertz detector. It is desirable that these fibers be polarization-maintaining fibers. As shown in FIG. 4C, the output from the fiber 22 at the terahertz-wave generating side is coupled via a lens 107 to the waveguide 103 of the terahertz-wave generator 200 that corresponds to the aforementioned optical frequency converter 100 according to the present invention. For optical coupling, it is desirable that the coupling efficiency be increased by integrating a Selfoc lens with the end of the optical fiber or by achieving a pigtail type by processing the aforementioned end so that the output is smaller than or equal to the numerical aperture (NA) of the waveguide 103 of the terahertz-wave generator 200. In this case, the ends may each be provided with a nonreflective coating so as to reduce Fresnel loss and undesired interference noise. Alternatively, by designing the fiber 22 and the waveguide 103 of the terahertz-wave generator 200 so that they have similar numerical apertures and similar mode field diameters, direct coupling (butt-coupling) by abutment is also permissible. In this case, an adhesive is appropriately selected so that an adverse effect caused by reflection can be reduced. As shown in FIG. 4C, the excitation light output from the waveguide 103 is absorbed by a damper or the like so as not to be mixed with the terahertz wave.

Figure 5A:
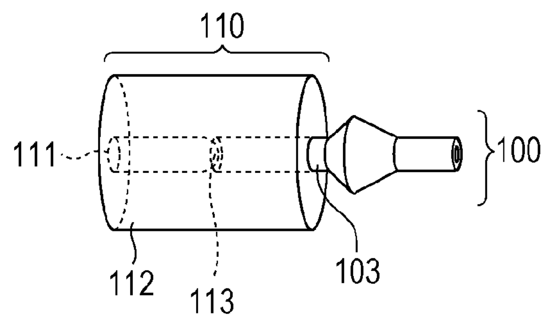
FIG. 5A is a structural diagram illustrating an example of how excitation light is input to a waveguide.
Figure 5B:
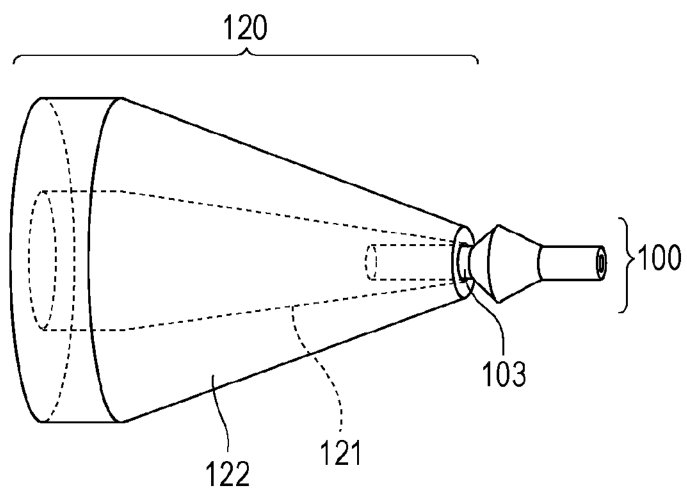
FIG. 5B is a structural diagram illustrating an example of how excitation light is input to a waveguide.
Figure 5C:
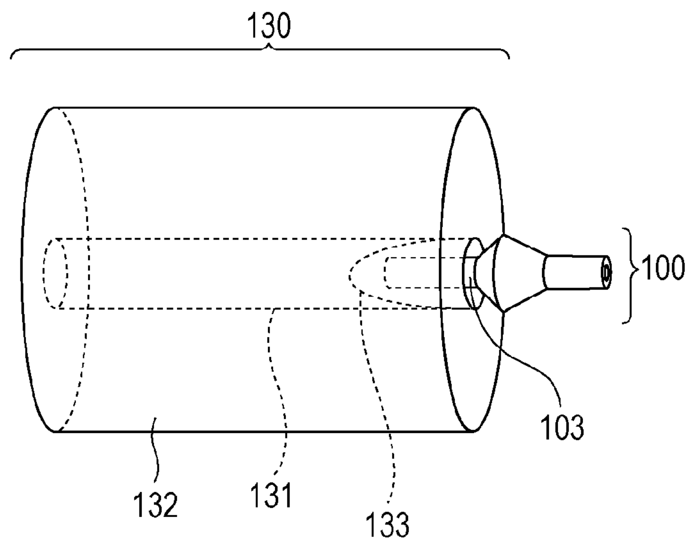
FIG. 5C is a structural diagram illustrating an example of how excitation light is input to a waveguide.

Because the optical frequency converter is equipped with a waveguide having a fiber structure, the optical frequency converter can be mounted to an optical fiber with relatively good matching properties. For example, referring to FIG. 5A, the waveguide 103 of the optical frequency converter 100 may be fitted into a hollow core portion of an optical fiber 110 constituted of a core 111 and cladding 112. In this case, an end of the core 111 is ground into a protrusion, and a refractive-index matching solution 113 is injected therein, thereby reducing reflection loss. This is effective especially when the optical fiber is a single-mode fiber with a core diameter of about several micrometers. Referring to FIG. 5B, the optical frequency converter 100 may be fitted and coupled to an end of an optical fiber 120 having a core 121 and cladding 122 with tapered ends. In this case, an impedance mismatch caused by a difference in core diameters is readily alleviated. Furthermore, referring to FIG. 5C, the optical frequency converter 100 may be fitted together with a refractive-index matching solution 133 into an optical fiber 130 in which a core 131 covered by cladding 132 has a recessed end. If the fiber 22 or the femtosecond laser 20 at the preceding stage includes a non-polarization-maintaining fiber component, it is desirable to stabilize the polarization of light entering the optical frequency converter 100 by using an inline-type polarization controller. However, the excitation light source is not limited to a fiber laser, and in that case, the countermeasure for stabilizing the polarization is reduced.

Although the terahertz wave generated by the terahertz-wave generator 200 according to the present invention is a beam with a donut-like shape at a near field side (i.e., immediately after the converging section 106), the terahertz-wave generator 200 is substantially unaffected at a far field side (e.g., a parabolic mirror 26*a*) where the beam is in the order of millimeters and is sufficiently wide.

The generated terahertz wave is detected by the THz-TDS-based configuration shown in FIG. 4A. Specifically, the terahertz wave is made into a collimated beam by the parabolic mirror 26*a* and is split by a beam splitter 25. One of the split beams is irradiated onto a sample 30 via a parabolic mirror 26*b*. The terahertz wave reflected from the sample 30 is converged by a parabolic mirror 26*c* and is received by a detector 29 defined by a photoconductor. The photoconductor used is normally a dipole antenna formed using low-temperature growth GaAs, and if the femtosecond laser 20 corresponds to 1.55 μm, a frequency-doubled wave is generated by using a SHG crystal (not shown) so as to provide probe light for the detector 29. In this case, in order to maintain the pulse shape, it is desirable to use PPLN (periodically poled lithium niobate) with a thickness of about 0.1 mm. If the femtosecond laser 20 corresponds to a 1-μm band, a fundamental wave can be used as the probe light in the detector 29, defined by the photoconductor constituted of an InGaAs single layer or MQW, without generating a frequency-doubled wave.

In this embodiment, synchronous detection can be performed by using a signal acquiring unit 32 that acquires a detection signal from the detector 29 via an amplifier 34. A data processing and output unit 33 is configured to acquire a terahertz signal waveform while using a personal computer or the like to move an optical delay unit 27 serving as a delay unit. The delay unit may be of any type so long as the delay unit is capable of adjusting a delay time between a time point at which the terahertz wave is generated by the terahertz-wave generator 200 serving as a generating unit and a time point at which the terahertz wave is detected by the detector 29 serving as a detecting unit.

The aforementioned device functions as a tomography device that uses the detecting unit to detect the terahertz wave radiated from the generator and subsequently reflected by the sample and that acquires an image of the internal structure of the sample by analyzing the reflected light from the sample. If there is a discontinuous section in the material inside the sample 30, a signal to be acquired by using the aforementioned device would have a reflective echo pulse occurring at a time position corresponding to the discontinuous section. Thus, a tomographic image can be obtained by one-dimensionally scanning the sample 30, or a three-dimensional image can be obtained by two-dimensionally scanning the sample 30. Since the aforementioned device can obtain a relatively high output terahertz pulse, the depth resolution can be improved. Moreover, since an excitation laser using fibers can be employed, the device can be reduced in size and cost.

In this embodiment, a method of inputting laser beams having two different oscillation frequencies ν1 and ν2 as excitation light and outputting a monochromatic terahertz wave corresponding to a difference in the frequencies may also be employed. In this case, when the frequency difference of input light is changed from 0.5 THz to 7 THz, the frequency of the terahertz wave to be radiated can be varied within that range. This embodiment can be applied to an inspection or imaging using a frequency of a specific terahertz waveband, for example, an inspection by checking the content of a specific material in a medicinal drug by adjusting the frequency to the absorption spectrum of that material.

Third Embodiment

Figure 6A:
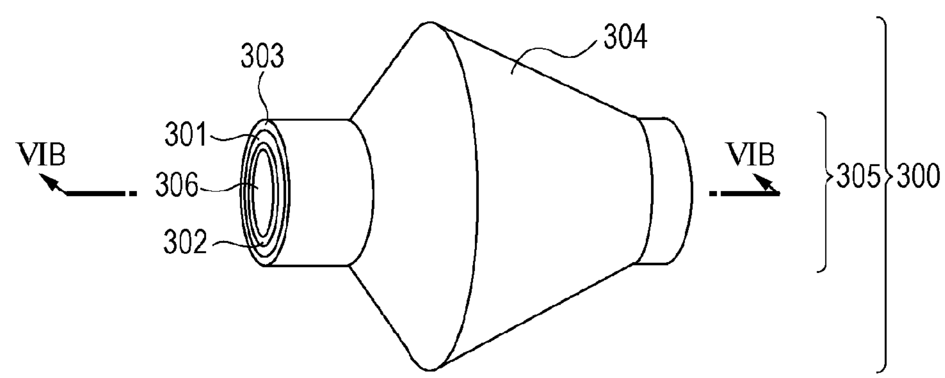
FIG. 6A is an external view illustrating an optical frequency converter according to a third embodiment of the present invention.
Figure 6B:
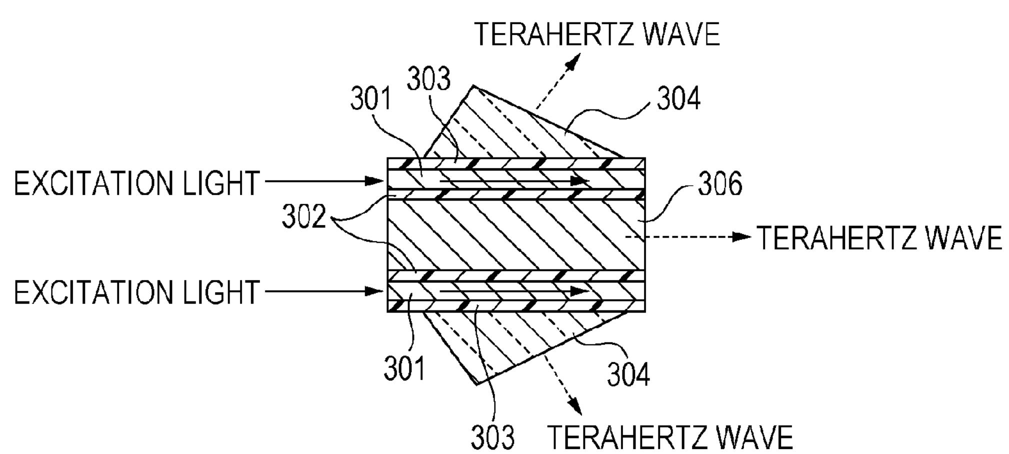
FIG. 6B is a cross-sectional view of the optical frequency converter according to the third embodiment of the present invention, taken along line VIB-VIB in FIG. 6A.

FIGS. 6A and 6B are structural diagrams illustrating an optical frequency converter according to a third embodiment of the present invention. Specifically, FIG. 6A is an external view of an optical frequency converter 300, and FIG. 6B is a cross-sectional view taken along line VIB-VIB in FIG. 6A. As shown in FIGS. 6A and 6B, in this embodiment, a waveguide 305 has an annular cross section, such as a ring-shaped cross section, and is formed by covering a surface of a columnar coupling section 306 with a core 302, cladding 301, and cladding 303 in that order. In addition, another coupling section 304 covers a surface of the waveguide 305. In this embodiment, excitation light may be annularly input to the core 302, or a plurality of excitation light beams may be input to different locations of the core 302. In this case, the phase matching condition can be satisfied by a nonlinear effect of the excitation light propagating through the core 302 so that a terahertz wave is radiated also toward the inner coupling section 306. Since the terahertz wave is radiated also from the center, an effect of a black spot of a beam center at the near field side is reduced. A Selfoc lens, an AR coating layer, a prism having a conical surface, or the like may be disposed at an end (i.e., a right end in FIGS. 6A and 6B) of the waveguide 305 including the coupling section 306, so that the terahertz wave can also be extracted to a space from the coupling section 306.

Fourth Embodiment

Figure 7A:
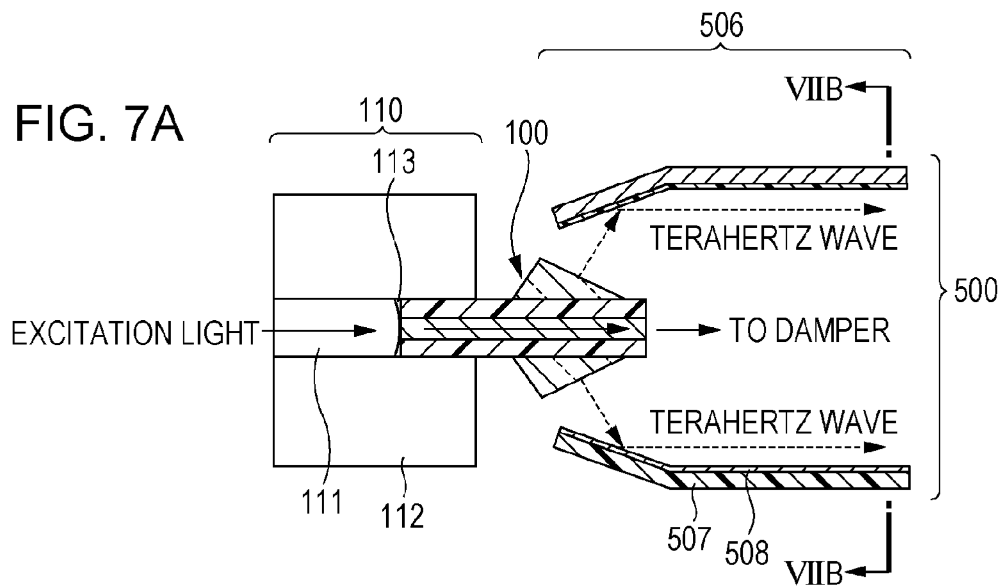
FIG. 7A is a cross-sectional view illustrating an optical frequency converter according to a fourth embodiment of the present invention.
Figure 7B:
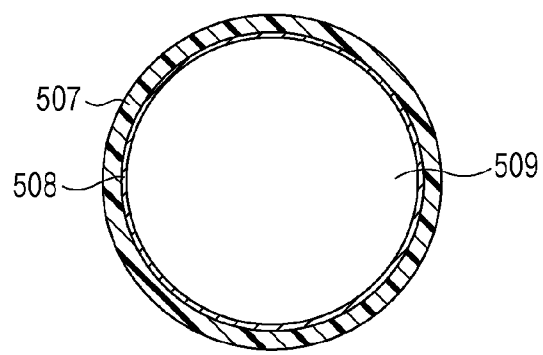
FIG. 7B is a cross-sectional view of the optical frequency converter according to the fourth embodiment of the present invention, taken along line VIIB-VIIB in FIG. 7A.
Figure 7C:
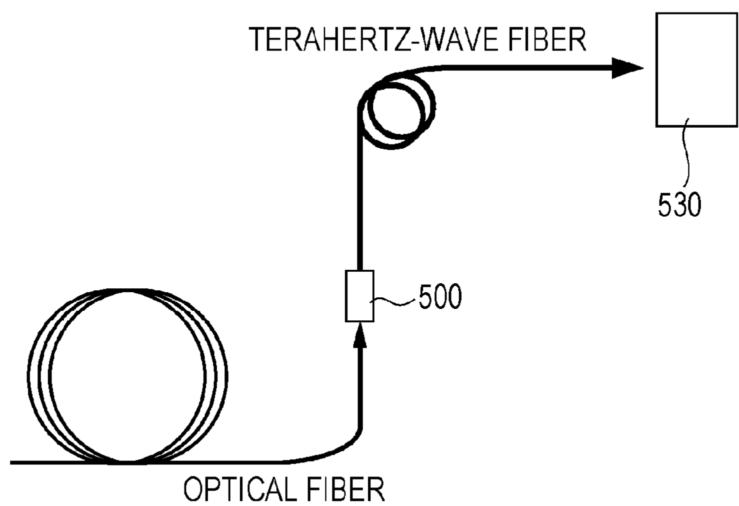
FIG. 7C is a structural diagram illustrating a fiber probe equipped with the optical frequency converter according to the fourth embodiment of the present invention.
Figure 8:
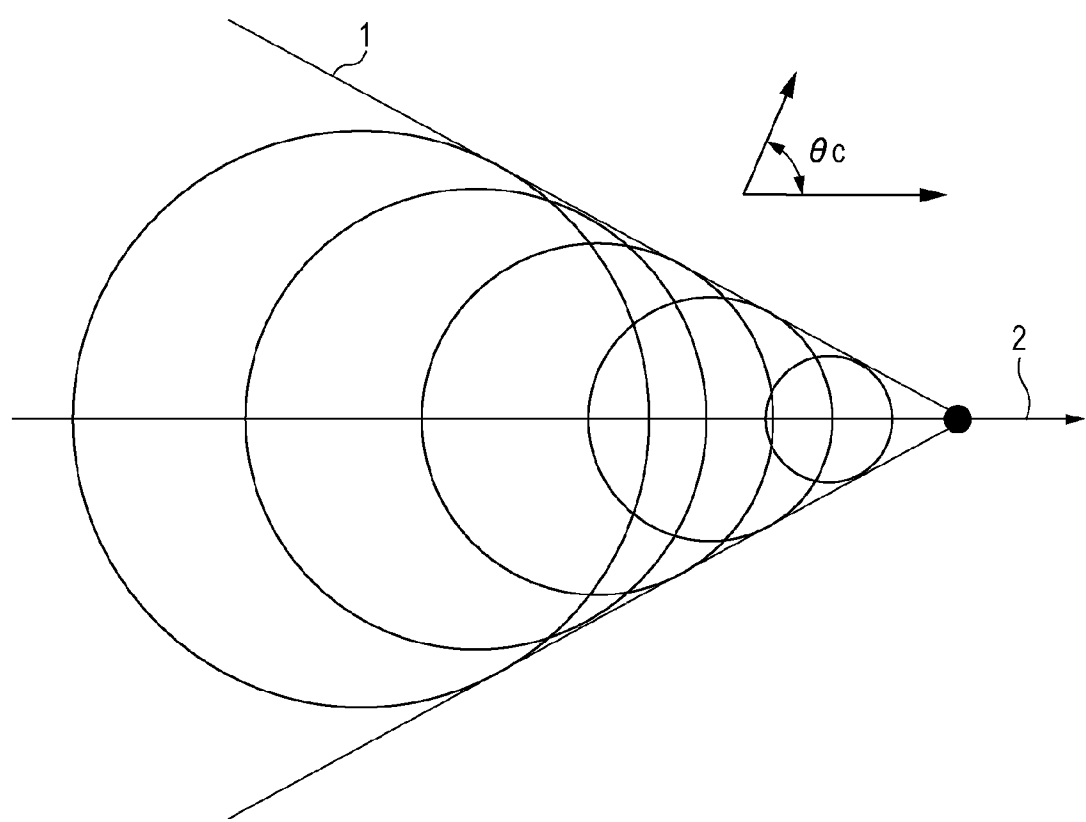
FIG. 8 is a schematic diagram illustrating electro-optical Cerenkov radiation.

As a fourth embodiment of the present invention, a fiber probe equipped with the optical frequency converter 100 as a coupler 500 serving as a component to be coupled to a terahertz-wave fiber will be described below with reference to FIGS. 7A to 7C. FIG. 7A is a cross-sectional view of the optical frequency converter 100, FIG. 7B is a cross-sectional view of the optical frequency converter 100 taken along line VIIB-VIIB in FIG. 7A, and FIG. 7C illustrates the fiber probe according to this embodiment. The optical frequency converter 100 used here is the same as that illustrated in FIGS. 1A to 1C. The optical fiber 110 and the optical frequency converter 100 are coupled with each other using the coupling method shown in FIG. 5A. Therefore, the optical frequency converter 100 is fitted as a protrusion into a hollow core portion of the optical fiber 110 constituted of the core 111 and the cladding 112. The core 111 has a protruding end, and the refractive-index matching solution 113 is injected therein, thereby reducing reflection loss.

A hollow fiber 506 is constituted of a metallic layer 508 composed of silver, a dielectric layer 507 composed of TPX, and a hollow core 509 with a diameter of 1 mm. The hollow fiber 506 is formed by coating an inner surface of a 1-mm-diameter plastic tube formed of the dielectric layer 507 having a wall thickness of 43 μm with silver. A left end of the hollow fiber 506 serves as a converging section that converges a terahertz wave from the optical frequency converter 100. The dielectric layer 507 may alternatively composed of glass instead of plastic.

With this configuration, light from the optical fiber 110 can be converted to a terahertz wave via the optical frequency converter 100 according to the present invention functioning as the coupler 500 and be guided to the terahertz-wave fiber. FIG. 7C illustrates an example of the fiber probe equipped with the coupler 500. Excitation light from an optical fiber is converted to a terahertz wave at the coupler 500 and is guided to the terahertz-wave fiber so as to be irradiated onto a sample 530. The interaction between the terahertz wave and the sample 530 is detected using a reflected wave. This fiber probe is suitable for performing an inspection or spectroscopy using a terahertz wave in a small space or a narrow gap, such as in a biological body or a micro-structural body, and can be applied to, for example, an endoscopic system. Furthermore, the fiber probe can also be used as a gas sensor or a liquid sensor by filling the hollow fiber 506 with gas or liquid.

Fifth Embodiment

Figure 10A:
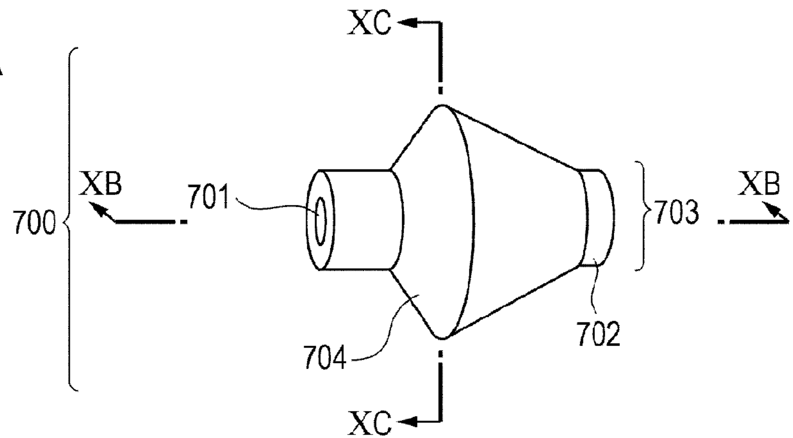
FIG. 10A is a structural diagram illustrating an optical frequency converter according to a fifth embodiment of the present invention.
Figure 10B:
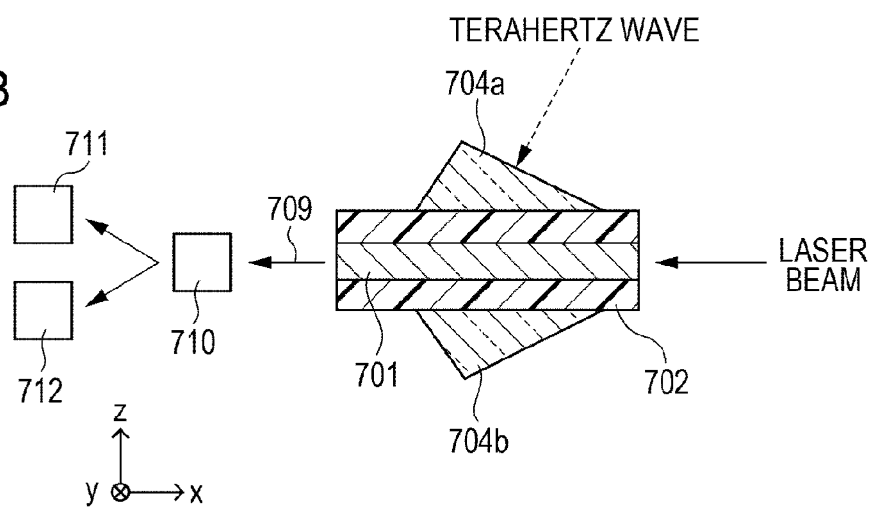
FIG. 10B is a cross-sectional view of the optical frequency converter according to the fifth embodiment of the present invention, taken along line XB-XB in FIG. 10A.
Figure 10C:
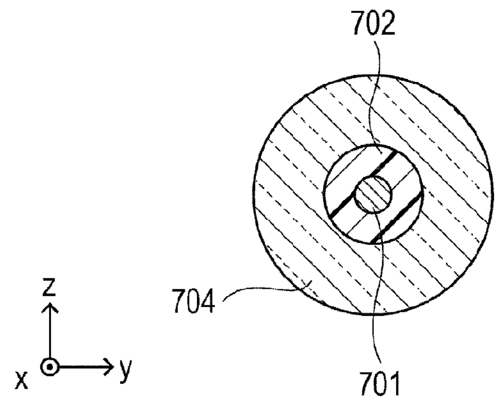
FIG. 10C is another cross-sectional view of the optical frequency converter according to the fifth embodiment of the present invention, taken along line XC-XC in FIG. 10A.

In this embodiment, an optical frequency converter having substantially the same structure as that in the first embodiment functions as a terahertz-wave detector. Referring to FIGS. 10A to 10C, a detector 700 includes a waveguide 703 constituted of a core 701 formed of a nonlinear optical crystal and cladding 702 that covers a surface of the core 701, and a coupling section 704 that covers the cladding 702. In this embodiment, an ultrashort pulsed laser beam is made to enter the structure from a side opposite of that in the above embodiments while the laser beam is polarized (e.g., by about 45°) from the z axis toward the y axis of the crystal. The laser beam input to the structure propagates through the waveguide 703 along the x axis and is output from the opposite face. With regard to an output laser beam 709, a phase difference occurs between a z-axis component and a y-axis component of an electric field due to birefringence of the nonlinear optical crystal. In a space into which the laser beam 709 is output, the laser beam 709 propagates therethrough as an elliptically polarized wave. Such a phase difference due to natural birefringence varies depending on the type of the crystal, the input polarization direction, and the length of the waveguide 703. A configuration with a zero phase difference is also possible.

In this embodiment, a terahertz wave is input from the coupling section 704. For example, when a terahertz pulse whose main axis of polarization is aligned with the z axis is input from the coupling section 704 formed of a conical silicon prism, a reversal process of the terahertz-wave generation process occurs, so that an interaction between the laser beam propagating through the waveguide 703 and the terahertz wave can be performed over the entire waveguide 703. As an example of such an interaction, the refractive index of the waveguide 703 in the z-axis direction is changed due to a Pockels effect, which is a kind of a second-order nonlinear process imparted to the nonlinear optical crystal by a terahertz electromagnetic field, causing the polarization state of the propagating beam to change. More specifically, the phase difference between the z-axis component and the y-axis component of the electric field of the laser beam changes due to induced birefringence, causing the ellipticity and the direction of the main axis of the elliptically polarized wave to change. By using an external polarizing element 710 and external photo-detectors 711 and 712 to detect a change in the propagating state of the laser beam, the electric-field amplitude of the terahertz wave can be detected. For example, in this embodiment, a Wollaston prism is used as the polarizing element 710 so as to split two polarized beams from each other, and a signal-to-noise (S/N) ratio is enhanced by differential amplification of the two photo-detectors 711 and 712. However, the differential amplification is not mandatory. Alternatively, the polarizing element 710 may be used as a polarizer, and the intensity may be detected by using a single photoconductor (not shown). As a further alternative, a phase compensation plate (such as a quarter-wave plate, not shown) for compensating for the natural birefringence may additionally be provided between the output end and the polarizing element 710.

The terahertz time-domain spectroscopy device and the tomography device as described in the above embodiments can be achieved by using the detector 700. The generator in that case may be of any type, such as a generator that employs a Cerenkov-type phase matching method as in the present invention or a generator that uses a photoconductor or the like as in the related art. Although light is input from the end opposite to where the light is generated in this embodiment, the light may alternatively be input from the end where the light is generated. In that case, the signal strength is reduced due to a smaller matching length. Furthermore, although the above description is directed to an example in which a terahertz pulse is detected using a pulsed laser beam, two laser beams having different frequencies may be input, and a monochromatic terahertz wave corresponding to a difference frequency component may be detected, as described in the first embodiment. In that case, by adjusting the difference in frequencies, a terahertz wave with a desired frequency can be extracted like with a filter so that the electric-field amplitude can be detected. As a terahertz-wave detection method described above, a change in the polarization state of the light due to a Pockels effect caused by a coupled terahertz wave is detected. An alternative detection method includes detecting a change in the phase of the light propagating through the waveguide as a change in the propagating state of the light, or detecting an optical signal corresponding to a difference between the frequency of the light propagating through the waveguide and the frequency of the coupled terahertz wave, that is, detecting a beat signal of the light.

Although preferred embodiments of the present invention have been described above, the present invention is not limited to these embodiments, and various modifications and alterations are permissible within the scope of the invention. Furthermore, the technical elements described in this specification or illustrated in the drawings exhibit technical advantages by themselves or by various combinations thereof and are not to be limited to the combinations defined in the claims at the time of application. Furthermore, the technologies described in this specification or illustrated in the drawings achieve multiple purposes at the same time and have technical advantages by achieving at least one of the purposes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-175827 filed Aug. 5, 2010 and No. 2011-154360 filed Jul. 12, 2011, which are hereby incorporated by reference herein in their entirety.

What is claimed is:

1. An optical frequency converter comprising:

a waveguide including a core made of a nonlinear optical medium having a refractive index $n_{1,light}$ in a wavelength region of light, and cladding disposed so as to cover the core and made of a material whose refractive index $n_{2,light}$ in the wavelength region of light is lower than the refractive index $n_{1,light}$; and a coupling section made of a material whose refractive index $n_{3,THz}$ in a wavelength region of a terahertz wave is higher than the refractive index $n_{1,light}$ and disposed in contact with the cladding, the coupling section being configured to couple the waveguide with a space in the wavelength region of the terahertz wave, wherein the coupling section covers the cladding, and wherein the cladding has a thickness that is set within a range in which the thickness is larger than or equal to a thickness that allows the intensity of the light propagating through the core to be smaller than or equal to $1/e^2$, e being a base of a natural logarithm, and in which the thickness is smaller than or equal to a thickness that is ½ of an equivalent wavelength of the terahertz wave in the cladding.

2. The optical frequency converter according to claim 1, wherein the coupling section has a rotational surface at an interface between the coupling section and the space, the rotational surface having an axis aligned with a direction of propagation of the light.

3. The optical frequency converter according to claim 1, further comprising a converging section configured to align a direction and a phase of the terahertz wave extracted to the space from the coupling section, the converging section having a rotational surface with an axis aligned with a direction of propagation of the light.

4. The optical frequency converter according to claim 1, wherein the waveguide has a fiber structure.

5. The optical frequency converter according to claim 1, wherein the waveguide has an annular cross section.

6. A terahertz time-domain spectroscopy device comprising:

a generating unit configured to generate a terahertz wave;

a detecting unit configured to detect the terahertz wave radiated from the generating unit; and a delay unit configured to adjust a delay time between a time point at which the terahertz wave is generated by the generating unit and a time point at which the terahertz wave is detected by the detecting unit, wherein at least one of the generating unit and the detecting unit includes the optical frequency converter according to claim 1.

7. The terahertz time-domain spectroscopy device according to claim 6, wherein the terahertz time-domain spectroscopy device functions as a tomography device that acquires an image of an internal structure of a sample by analyzing reflected light from the sample.

8. The optical frequency converter according to claim 1, wherein the cladding has the thickness that is set within a range in which the thickness is smaller than or equal to a thickness that is 1/10 of the equivalent wavelength of the terahertz wave in the cladding.

9. An optical frequency converter comprising:

a waveguide including a core made of a nonlinear optical crystal having a refractive index $n_{1,light}$ in a wavelength region of light, and cladding disposed in contact with the core and made of a material whose refractive index $n_{2,light}$ in the wavelength region of light is lower than the refractive index $n_{1,light}$; and a coupling section made of a material whose refractive index $n_{3,THz}$ in a wavelength region of a terahertz wave is higher than the refractive index $n_{1,light}$ and disposed in contact with the cladding, the coupling section being configured to extract the terahertz wave radiated due to a nonlinear optical effect of the light propagating through the waveguide into a space, wherein the cladding has a thickness that is set within a range in which the thickness is larger than or equal to a thickness that allows the intensity of the light propagating through the core to be smaller than or equal to $1/e^2$, e being a base of a natural logarithm, and in which the thickness is smaller than or equal to a thickness that is 1/10 of an equivalent wavelength of the terahertz wave in the cladding.

10. A terahertz time-domain spectroscopy device comprising:

a generating unit configured to generate a terahertz wave;

a detecting unit configured to detect the terahertz wave radiated from the generating unit; and a delay unit configured to adjust a delay time between a time point at which the terahertz wave is generated by the generating unit and a time point at which the terahertz wave is detected by the detecting unit, wherein at least one of the generating unit and the detecting unit includes the optical frequency converter according to claim 9.

11. An optical frequency converter comprising:

a waveguide including a core made of a nonlinear optical medium having a refractive index $n_{1,light}$ in a wavelength region of light, and cladding disposed so as to cover the core and made of a material whose refractive index $n_{2,light}$ in the wavelength region of light is lower than the refractive index $n_{1,light}$; and a coupling section made of a material whose refractive index $n_{3,THz}$ in a wavelength region of a terahertz wave is higher than the refractive index $n_{1,light}$ and disposed in contact with the cladding, the coupling section being configured to couple the waveguide with a space in the wavelength region of the terahertz wave, wherein the coupling section covers the cladding, and wherein electro-optical Cerenkov radiation is derived from a nonlinear optical effect.

12. A terahertz time-domain spectroscopy device comprising:

a generating unit configured to generate a terahertz wave;

a detecting unit configured to detect the terahertz wave radiated from the generating unit; and a delay unit configured to adjust a delay time between a time point at which the terahertz wave is generated by the generating unit and a time point at which the terahertz wave is detected by the detecting unit, wherein at least one of the generating unit and the detecting unit includes the optical frequency converter according to claim 11.

13. An optical frequency converter comprising:

a waveguide including a core made of a nonlinear optical medium having a refractive index $n_{1,light}$ in a wavelength region of light, and cladding disposed so as to cover the core and made of a material whose refractive index $n_{2,light}$ in the wavelength region of light is lower than the refractive index $n_{1,light}$; and a coupling section made of a material whose refractive index $n_{3,THz}$ in a wavelength region of a terahertz wave is higher than the refractive index $n_{1,light}$ and disposed in contact with the cladding, the coupling section being configured to couple the waveguide with a space in the wavelength region of the terahertz wave, wherein the coupling section covers the cladding, and wherein the core and the coupling section are configured so that the light propagating through the core satisfies a phase matching condition of electro-optical Cerenkov radiation.

14. A terahertz time-domain spectroscopy device comprising:

a generating unit configured to generate a terahertz wave;

a detecting unit configured to detect the terahertz wave radiated from the generating unit; and a delay unit configured to adjust a delay time between a time point at which the terahertz wave is generated by the generating unit and a time point at which the terahertz wave is detected by the detecting unit, wherein at least one of the generating unit and the detecting unit includes the optical frequency converter according to claim 13.

* * * * *